(12) United States Patent
Noguchi et al.

(10) Patent No.: US 7,006,131 B2
(45) Date of Patent: *Feb. 28, 2006

(54) IMAGE PICKUP APPARATUS, NAVIGATION APPARATUS AND IC CARD

(75) Inventors: Fujio Noguchi, Tokyo (JP); Yuji Haraguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 88 days.

This patent is subject to a terminal disclaimer.

(21) Appl. No.: 11/082,879

(22) Filed: Mar. 18, 2005

(65) Prior Publication Data

US 2005/0162533 A1    Jul. 28, 2005

Related U.S. Application Data

(63) Continuation of application No. 09/358,520, filed on Jul. 22, 1999, now Pat. No. 6,903,763.

(30) Foreign Application Priority Data

Jul. 27, 1998  (JP)  ............................... P10-211529

(51) Int. Cl.
*H04N 5/225*  (2006.01)
(52) U.S. Cl. ................. 348/207.99; 348/116; 348/148; 348/239
(58) Field of Classification Search ............ 348/207.99
See application file for complete search history.

(56) References Cited

U.S. PATENT DOCUMENTS

| 4,122,521 | A | 10/1978 | Rick et al. |
| 4,807,157 | A | 2/1989 | Fukushima et al. |
| 5,528,518 | A | 6/1996 | Bradshaw et al. |
| 5,774,569 | A | 6/1998 | Waldenmaier |
| 5,982,298 | A | 11/1999 | Lappenbusch et al. |
| 6,199,014 | B1 | 3/2001 | Walker et al. |
| 6,285,317 | B1 | 9/2001 | Ong |
| 2002/0001032 | A1 | 1/2002 | Ohki |
| 2003/0032435 | A1 | 2/2003 | Asada et al. |

FOREIGN PATENT DOCUMENTS

| DE | 3726065 | 1/1988 |
| DE | 19800336 | 7/1998 |
| EP | 0377480 | 7/1990 |
| EP | 0836167 | 4/1998 |

*Primary Examiner*—David L. Ometz
*Assistant Examiner*—Heather R. Long
(74) *Attorney, Agent, or Firm*—Oblon, Spivak, McClelland, Maier & Neustadt, P.C.

(57) ABSTRACT

An image pickup apparatus including location information acquiring means for acquiring current location information and image pickup means for capturing an image of a desired object and outputting the captured image. The image pickup apparatus further includes associating means for automatically relating the captured image to the current location information and outputting information about relations as management data, and includes recording means for recording the captured image, the current location information, and the management data to a removable solid-state storage medium.

1 Claim, 10 Drawing Sheets

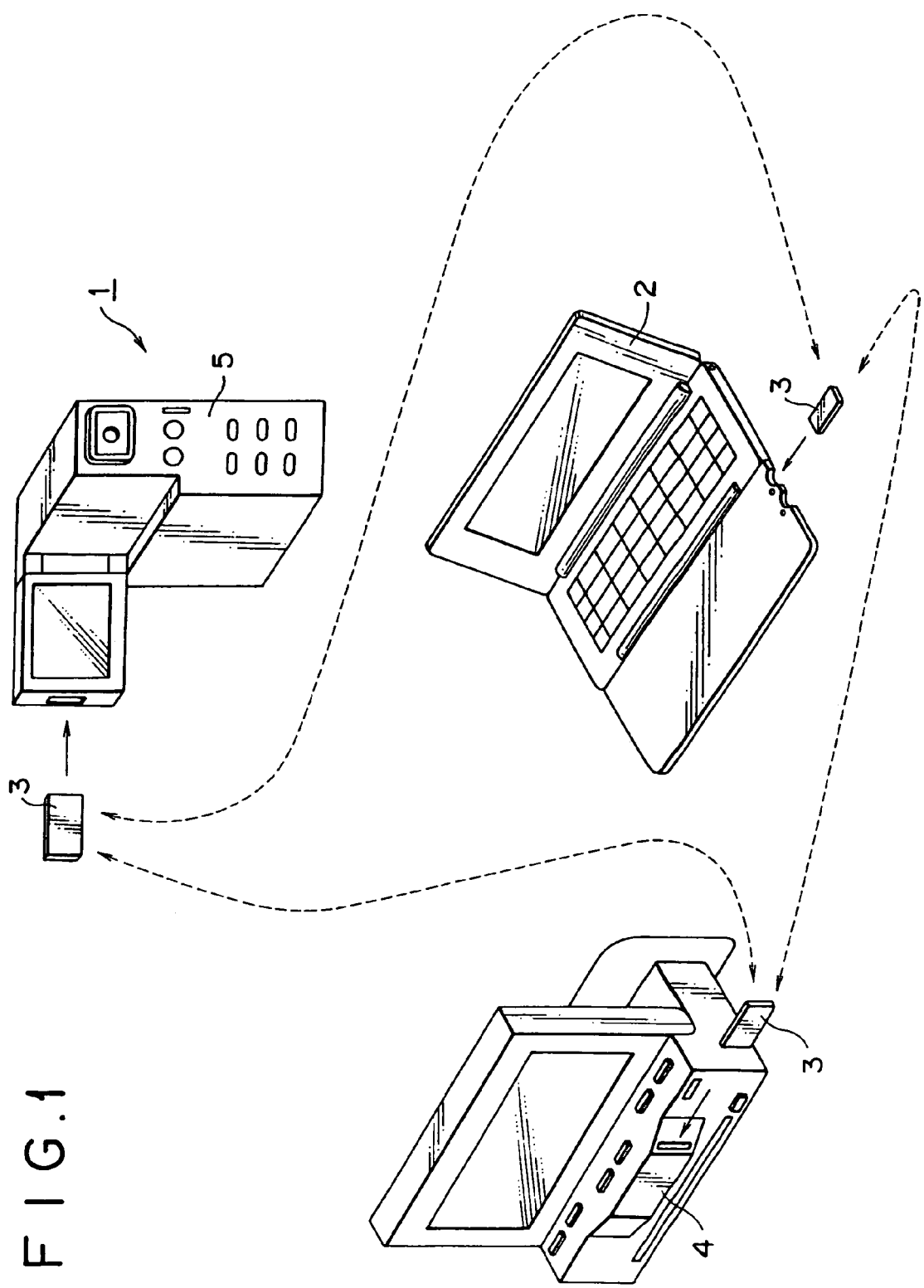
F I G. 1

IMAGE PICKUP APPARATUS, NAVIGATION APPARATUS AND IC CARD

CROSS-REFERENCE TO RELATED APPLICATIONS

This application claims priority under 35 U.S.C. §119 and is related to Japan P10-211529 filed Jul. 27, 1998. This application is a continuation of U.S. Ser. No. 09/358,520, filed Jul. 22, 1999, now U.S. Pat. No. 6,903,763 the entire contents of which are incorporated by reference.

BACKGROUND OF THE INVENTION

The present invention relates to an image pickup apparatus, a navigation apparatus, and an IC card. More particularly, the invention relates to a video camera for recording captured images to an IC card, the IC card for use with the video camera, and a car navigation apparatus sharing the IC card with the video camera. The inventive apparatuses allow captured images to be recorded in conjunction with location information and enable still images to be displayed by use of the location information, whereby information about locations where the recordings were made is easily recorded and effectively utilized illustratively for car navigation purposes.

There exist electronic still cameras and like devices allowing titles and other information to be attached additionally to images following image pickup operations. This feature is used illustratively to record, in conjunction with the captured images, locations where the image recordings were made.

It has been recognized that the recording of such location information, if carried out easily, further improves the ease of use of image pickup apparatuses such as the one mentioned above.

The above type of image pickup apparatus is often used at resorts and tourist spots. For that reason, the image pickup apparatus is expected to further enhance its ease of operation if used in combination with a car navigation apparatus for a guided trip to a tourist destination in order to easily record information about locations where the recordings were made.

SUMMARY OF THE INVENTION

It is therefore an object of the present invention to provide an image pickup apparatus, a car navigation apparatus and related means for readily recording information about locations for effective use in car navigation and other applications.

In carrying out the invention and according to one aspect thereof, there is provided an image pickup apparatus including: location information acquiring means for acquiring current location information; image pickup means for capturing an image of a desired object and outputting the captured image; and recording means for relating the captured image to the current location information when recording the captured image and the current location information to a removable solid-state storage medium.

According to another aspect of the invention, there is provided a navigation apparatus for providing guidance regarding a route to a destination; wherein information about the route stored previously in a removable storage medium is retrieved therefrom; wherein image data recorded previously in the removable storage medium in relation to the route information are retrieved therefrom; and wherein the image data are displayed in conjunction with the route information.

According to a further aspect of the invention, there is provided an IC card inserted into a navigation apparatus providing guidance regarding a route to a destination so as to store information about the route; wherein image data related to the route are recorded in the IC card in correspondence with locations along the route.

Other objects, features and advantages of the invention will become more apparent upon a reading of the following description and appended drawings.

BRIEF DESCRIPTION OF THE DRAWINGS

FIG. 1 is a schematic view of a car navigation system embodying the invention;

DESCRIPTION OF THE PREFERRED EMBODIMENTS

Figure 2:
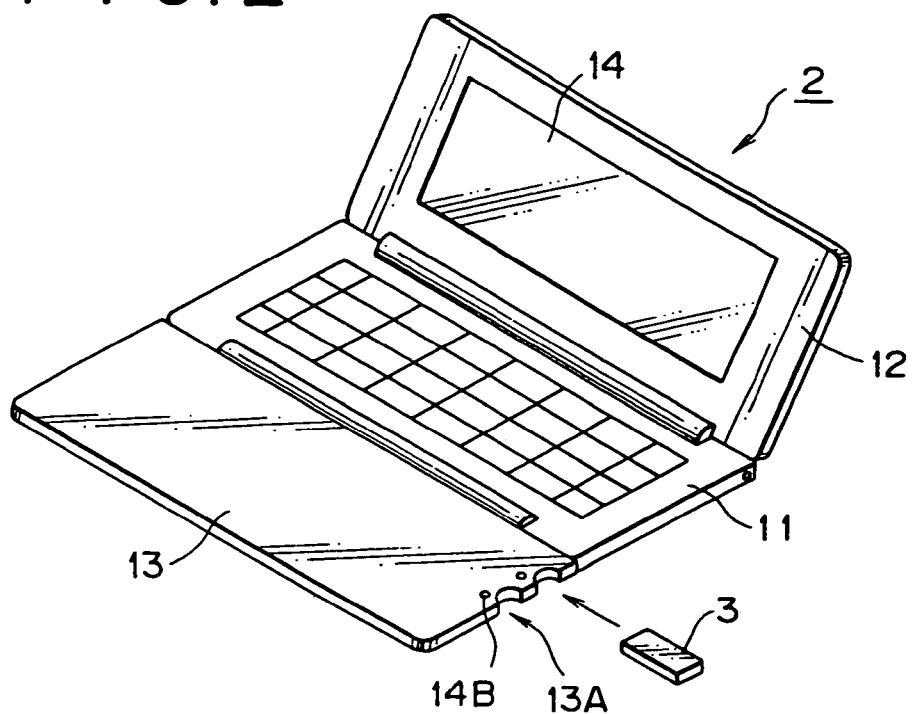
FIG. 2 is a perspective view of a personal computer included in FIG. 1.

Preferred embodiments of this invention will now be described with reference to the accompanying drawings.

FIG. 1 is a schematic view of a car navigation system practiced as an embodiment of the invention. The car navigation system 1 illustratively utilizing a personal computer 2 selects a route from a starting point to a destination and records the selected route to an IC card 3. The IC card 3 is then loaded into a car navigation apparatus 4 on board a vehicle so that the driver of the vehicle may be guided by the recorded route retrieved from the card.

Once the destination such as a tourist spot is reached, the IC card 3 is loaded into a video camera 5. Still images are recorded to the IC card 3 by the video camera 5. When the IC card 3 is loaded back into the onboard car navigation apparatus 4, the recorded contents are checked on the apparatus to make sure that the images have been correctly picked up. At a later date, the IC card 3 may be placed into the personal computer 2 also to verify the still images. Whether the still images are checked by the car navigation apparatus 4 or by the personal computer 2, location information stored in conjunction with the captured images is utilized.

Figure 3:
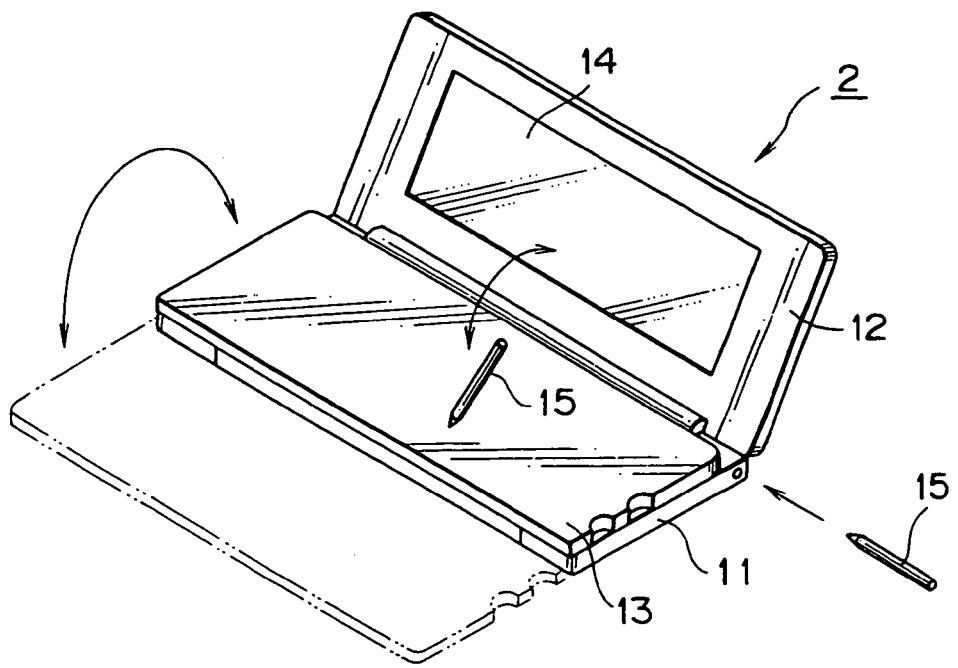
FIG. 3 is a perspective view of the personal computer in FIG. 2 with its tablet swung in an overlaid fashion onto its body.

FIG. 2 is a perspective view of the personal computer 2, and FIG. 3 is a perspective view of the personal computer 2 with its tablet positioned in an operable state.

A lid 12 is attached rotatably to a pivot at the back of a body 11 of the personal computer 2. A tablet 13 is attached rotatably to another pivot at the front of the body 11. The lid 12 houses a liquid crystal display (LCD) panel 14, and the body 11 incorporates a keyboard. The personal computer 2 is readied for operation when the lid 12 is swung open from the body 11 and the tablet 13 is unfolded in an arrowed direction in FIG. 3. The keyboard is then operated to activate desired application software while the LCD panel 14 is being visually checked.

The personal computer 2 has one of its pivots equipped with a switch to turn on and off the tablet 13 depending on the rotated tablet position. Specifically, when the tablet 13 is folded in an overlaid fashion onto the keyboard (as shown in FIG. 3), the switch is activated to render the tablet 13 operable. The personal computer 2 is thus reduced in size for improved portable usage. The tablet 13 with its enlarged surface area is easier to operate than before.

A slot 13A formed at the right-hand edge of the tablet 13 accommodates the IC card 3. Near the slot 13A is an indicator composed of a light-emitting diode 14B. Loading the IC card 3 into the slot 13A illuminates the light-emitting diode (LED) 14B. The LED 14B blinks while the IC card 3 is being accessed. One edge of the body 11 houses a pen 15 that serves as a pointing device for operating the tablet 13.

Figure 4:
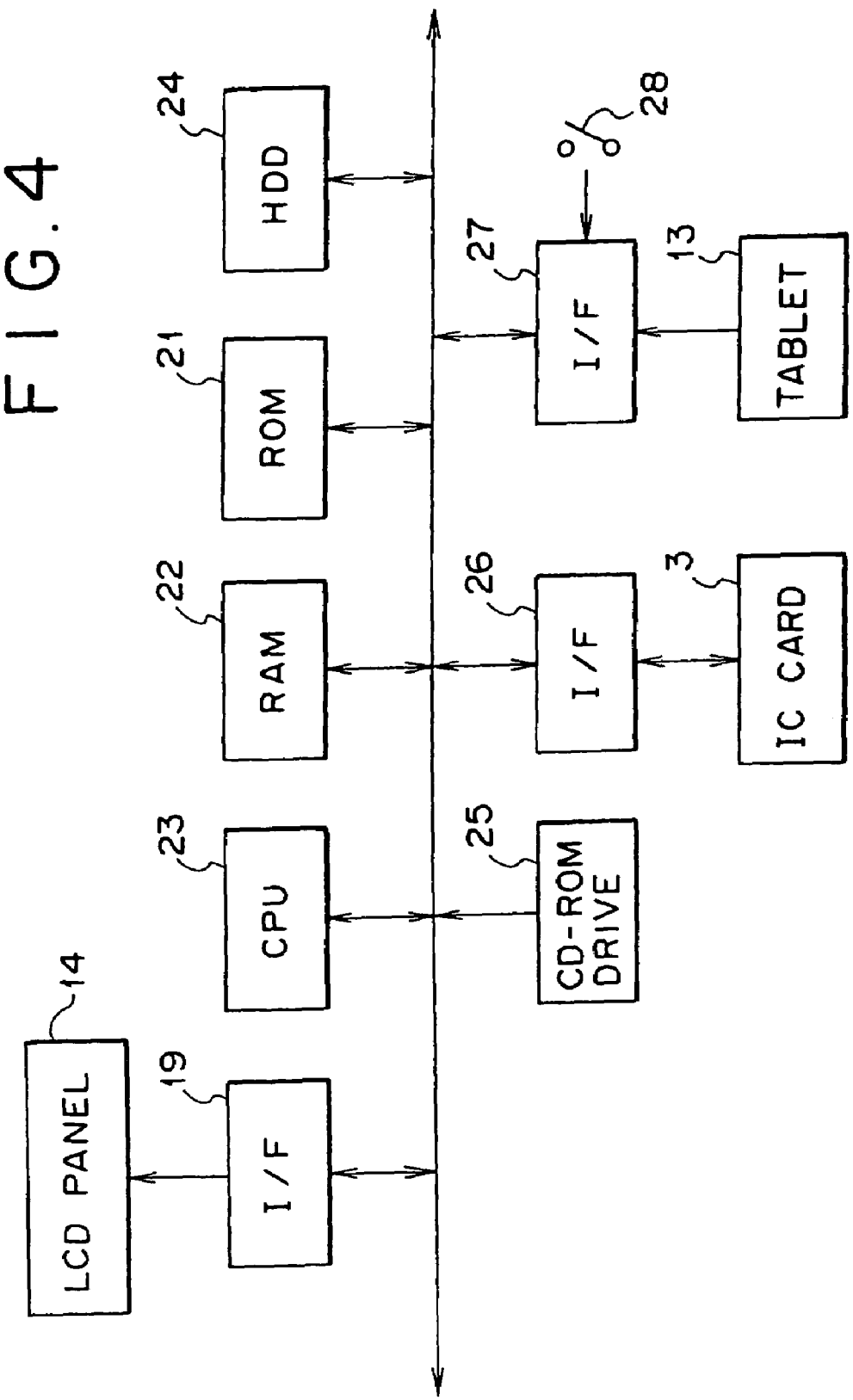
FIG. 4 is a block diagram of the personal computer in FIG. 2.

FIG. 4 is a block diagram of the personal computer 2. As with ordinary personal computers, the personal computer 2 allocates a work area in a random access memory (RAM) 22 according to data held in a read-only memory (ROM) 21, and gets a central processing unit (CPU) 23 to execute programs stored on a hard disk drive (HDD) 24.

Upon execution of an application program or the like, the personal computer 2 drives the LCD panel 14 through an interface 19 to generate a display screen. A CD-ROM set in a CD-ROM drive 25 is accessed illustratively so as to load map information therefrom. The personal computer 2 gains access to the IC card 3 through another interface 26, and displays a cursor and other indications based on coordinate information entered through the tablet 13 by way of another interface 27.

The interface 27 of the personal computer 2 detects a swinging motion of the tablet 13 by means of a switch 28 incorporated in the pivot of the tablet 13. Specifically, when the tablet 13 is folded in an overlaid fashion onto the keyboard, the switch 28 is activated to let coordinate data be input through the tablet 13. As long as the tablet 13 is in the unfolded state, the personal computer 2 inhibits coordinate data acquisition through the tablet 13. In this manner, an unfolded tablet 13 is not inadvertently operated if it comes into accidental contact with diverse objects.

The interface 26 is connected to the IC card 3 through a connector located deep inside the above-mentioned slot 13A. The interface 26 monitors the voltage of a predetermined terminal of the connector, detecting insertion or removal of the card when the terminal voltage is changed. Once the IC card 3 is found inserted, the card 3 is accessed and a check is made to see if the card 3 is properly loaded. If the IC card 3 is judged to be appropriately inserted, the LED 14B is illuminated. While the IC card 3 is being accessed under control of the CPU 23, the LED 14B is made to blink.

Figure 5:
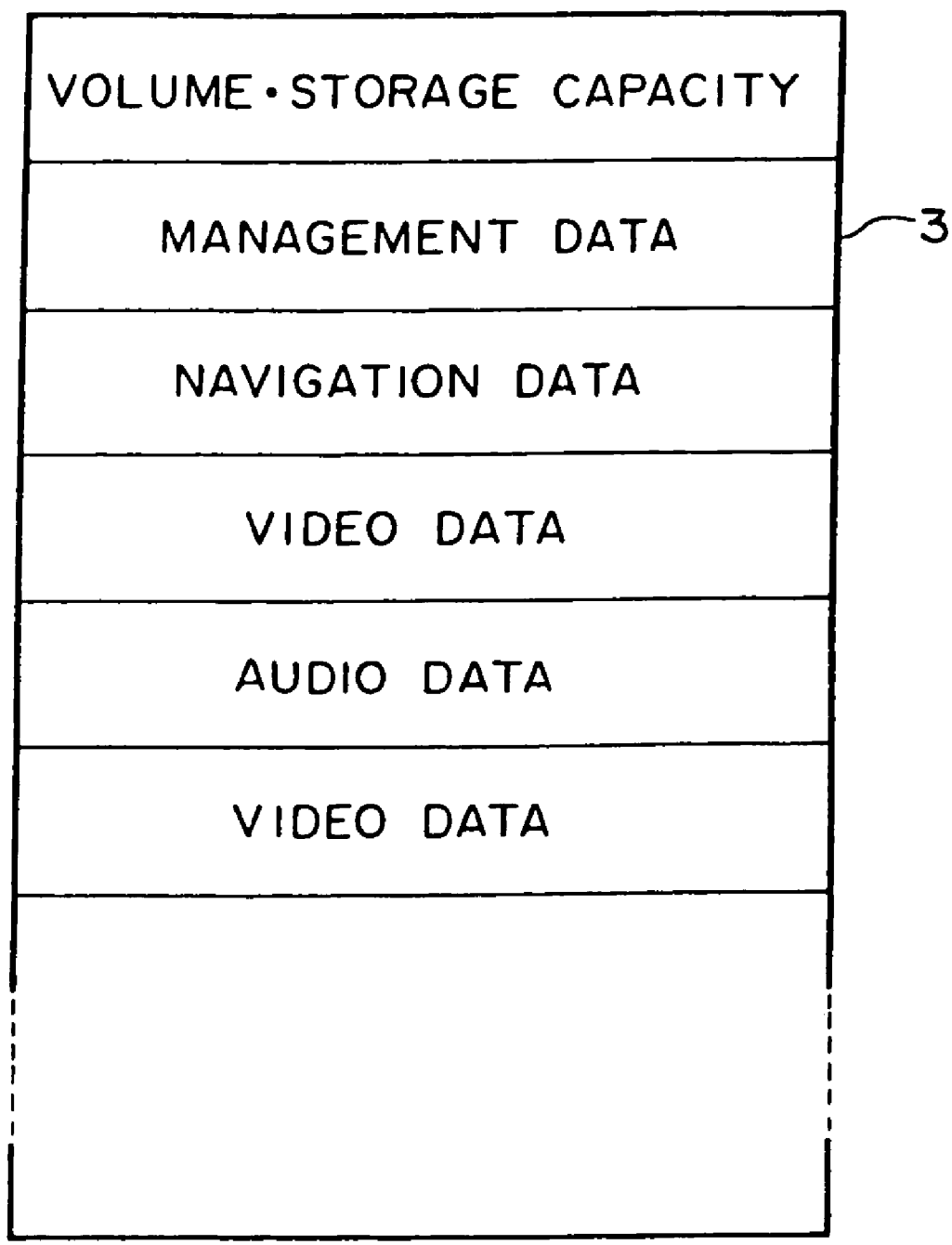
FIG. 5 is a schematic view of an IC card format.

FIG. 5 is a schematic view showing a typical memory space of the IC card 3. In the IC card 3, a volume and a total storage capacity of the card are recorded at the top of the memory space followed by a management data table and user areas. The user areas comprise navigation data files, video data files and audio data files. The management data table records user area management data such as addresses of files recorded in the user areas, dates and times of day of recordings, information about locations where the recordings were made, file types (navigation data, video data, audio data, text data, compressed format, etc.), and the remaining storage capacity. The management data also include relations between files recorded in the user areas. The relations are established by pointers each made up of a predetermined number of bits.

If a file recorded in a user area of the IC card 3 is a video data file, management data recorded in conjunction with the file permit detection of the location where the recording was made. The relations associated with the file reveal illustratively that the file in question was recorded during a trip conducted in accordance with specific navigation data.

When the IC card 3 is loaded, the interface 26 accesses the card in keeping with an application program currently in use. A volume, a total storage capacity and management data are retrieved from the IC card 3 and sent to the CPU 23. If a user area is accessed and updated in accordance with the application program executed as per the management data, the management data are updated to reflect the changes of the user area under control of the CPU 23.

Figure 6:
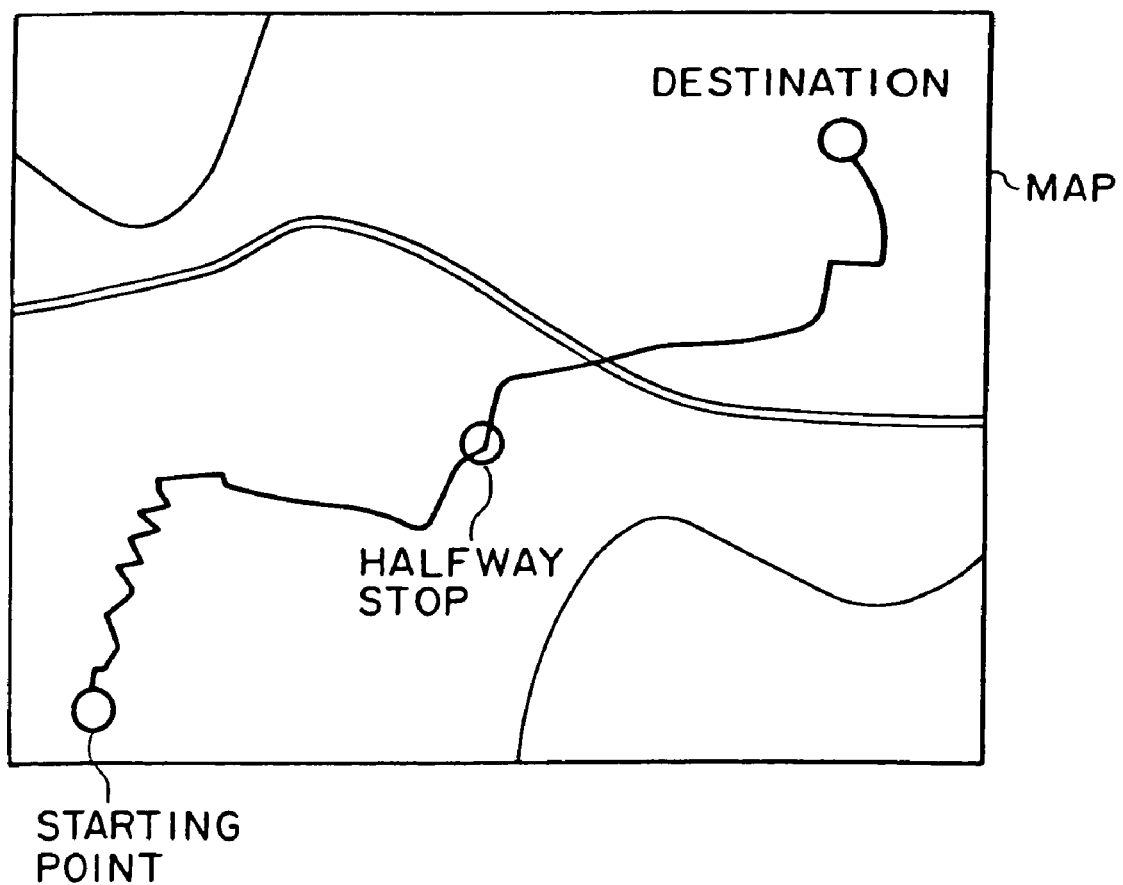
FIG. 6 is a schematic view of a display screen on the personal computer in FIG. 2.

FIG. 6 is a schematic view of a display screen generated by car navigation software, i.e., an application program carried out in the manner described above. Through a map displayed by the car navigation software, the CPU 23 permits settings of a starting point, a halfway stop, a destination, and a route connecting these points by use of the keyboard and the tablet 13. The CPU 23 then writes to the IC card 3 data on the established route as car navigation data along with data about the date of the trip.

Figure 7:
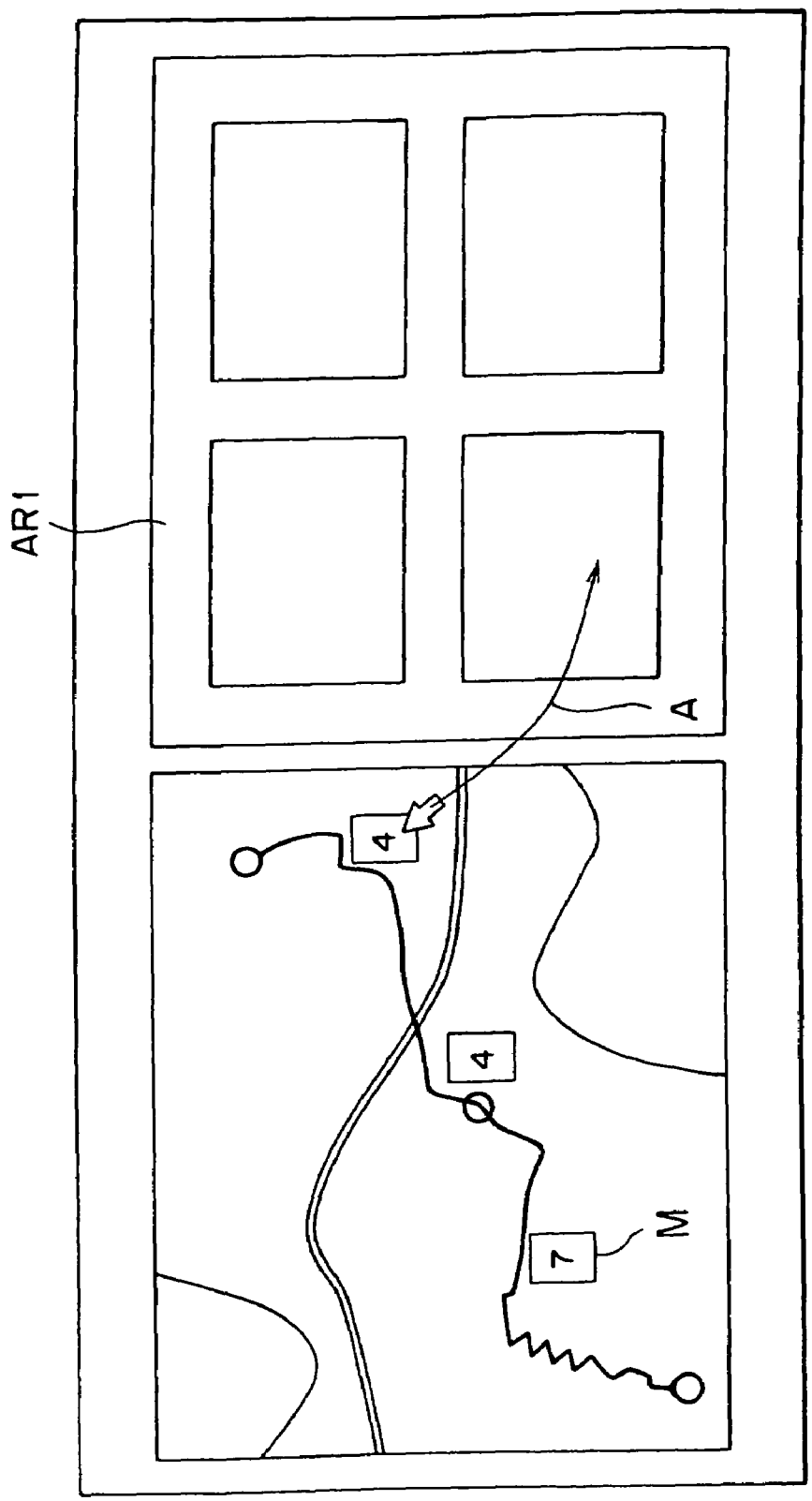
FIG. 7 is a schematic view of a variation of the display screen in FIG. 6.

FIG. 7 is a schematic view of another display screen generated by image processing software working in concert with the car navigation software. With the image processing software in effect, the CPU 23 displays on a map the car navigation data recorded in the IC card 3 by the user's operation. If the management data in the IC card 3 include still image data associated with the car navigation data, then locations where recordings were made are displayed on the map in accordance with the location information about the files involved. In addition, the number of captured images M (i.e., number of images recorded in the IC card 3) is indicated for each recording location. The image count M appears in each of rectangular frames showing images, indicating the number of images picked up in each recording location.

The image count indication may be dragged by operation of the tablet 13 into a display area AR1 to the right as shown by an arrow A. The drag action causes the data about the corresponding file to be loaded from the IC card 3 for display into the area AR1. In this manner, the personal computer 2 permits easy verification of image data that are recorded in the IC card 3 along with location information in conjunction with car navigation data. An appropriate operation by the user causes the CPU 23 to output the displayed still images onto a printer or through other means.

Figure 8:
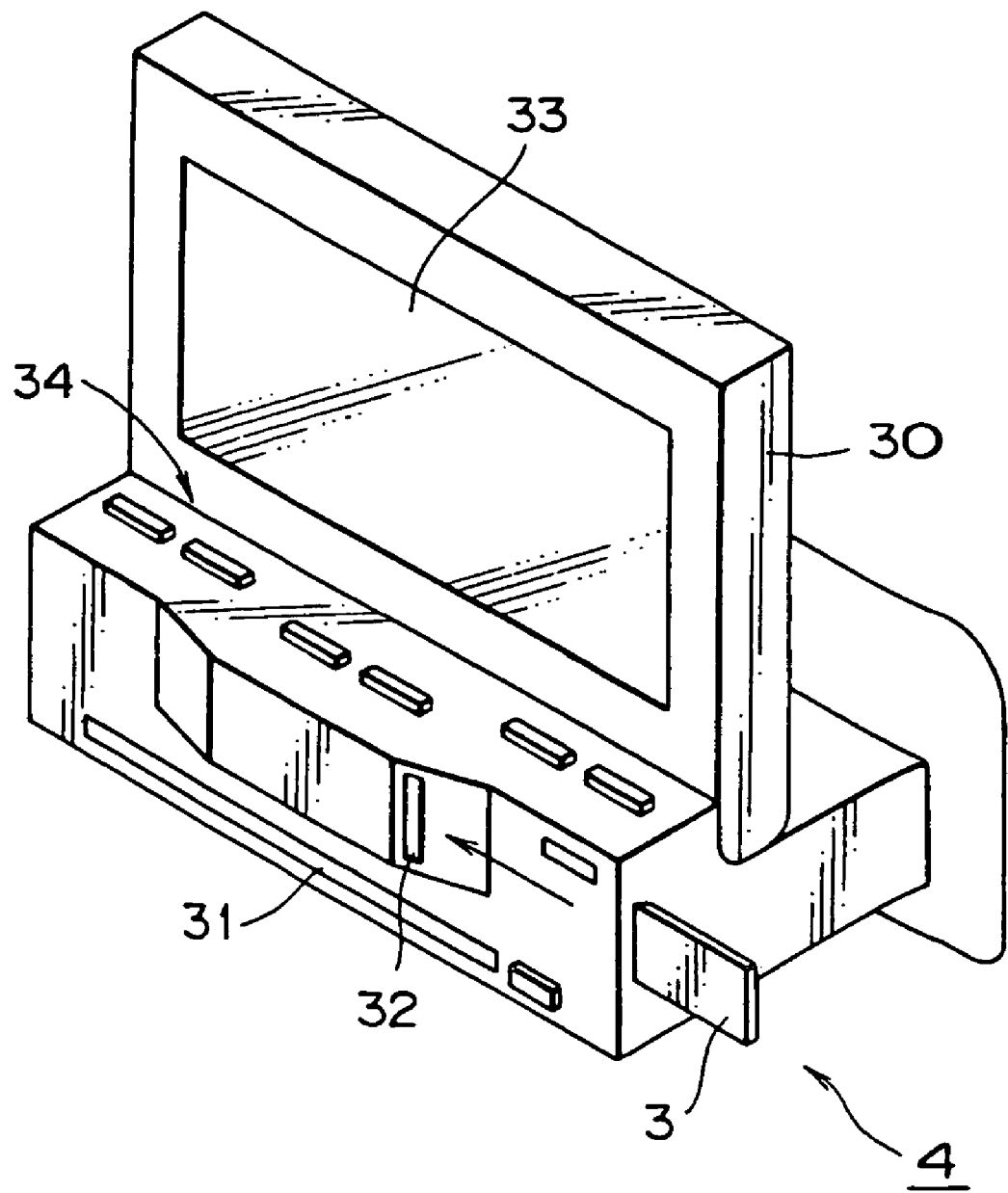
FIG. 8 is a perspective view of a car navigation apparatus included in FIG. 1.

FIG. 8 is a perspective view of the car navigation apparatus 4. The apparatus 4 is accommodated illustratively in a dashboard of a vehicle. To get the car navigation apparatus 4 retracted into the dashboard, the user pushes the apparatus as a whole. The pushing action causes the entire apparatus temporarily to move forward to let a liquid crystal display (LCD) part 30 collapse backward before the whole assembly retracts back into the dashboard. To get the retracted car navigation apparatus 4 to come out for use, the user pushes the apparatus housing exposed on the dashboard. The user's pushing action causes the apparatus 4 as a whole to move forward to let the LCD part 30 stand upright before the entire assembly moves back into an operable state (as shown in FIG. 8).

A long, narrow opening 31 is formed at the front of the car navigation apparatus 4. A CD or a CD-ROM is loaded through the opening 31 into the apparatus 4. An upper part of the opening 31 projects in a rectangular fashion. One side of the rectangular projection has a slot 32 formed to accommodate the IC card 3. The LCD part 30 of the car navigation apparatus 4 comprises an LCD panel 33. At the bottom of the LCD part 30 are various controls 34.

Figure 9:
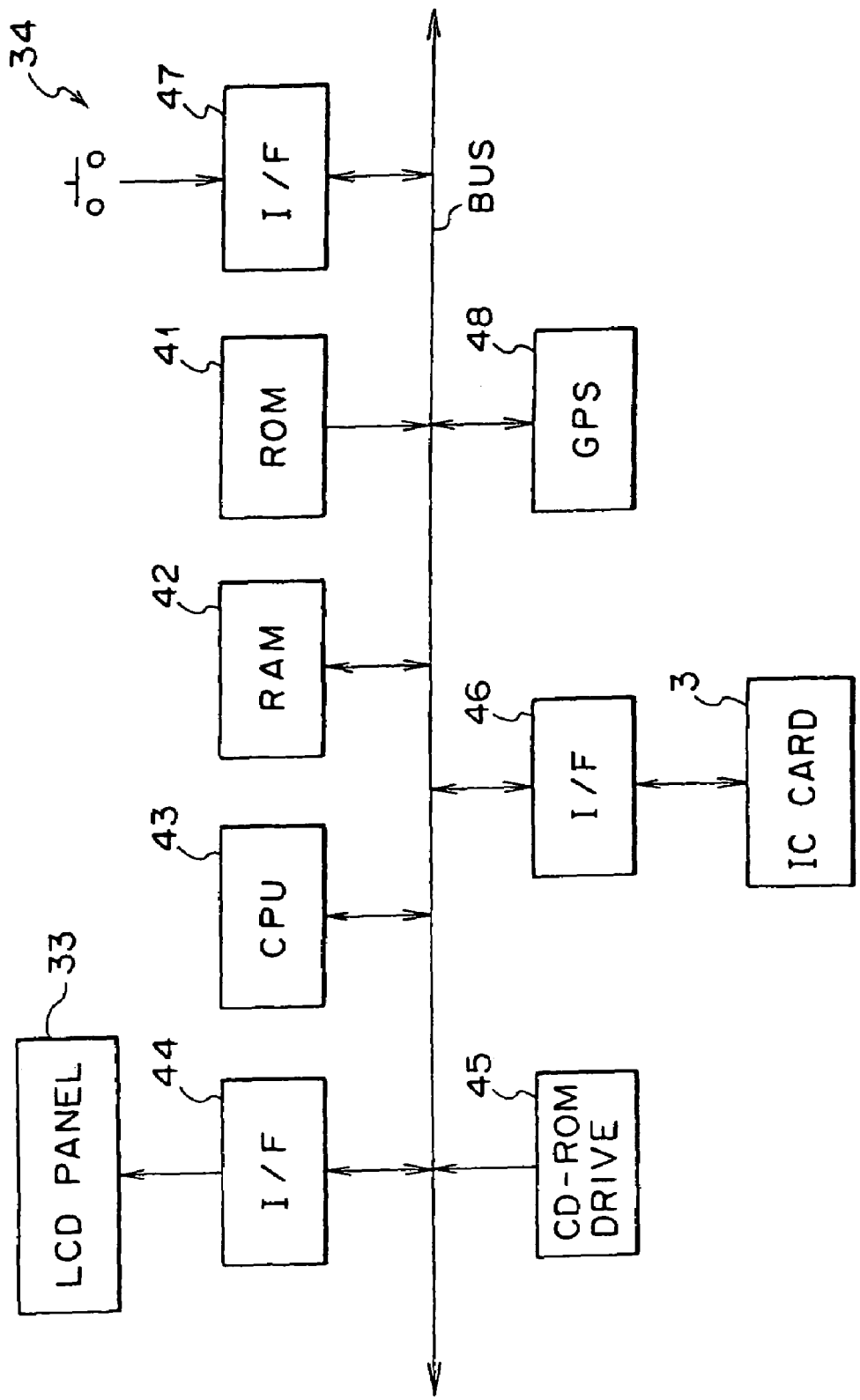
FIG. 9 is a block diagram of the car navigation apparatus in FIG. 8.

FIG. 9 is a block diagram of the car navigation apparatus 4. The car navigation apparatus 4 allocates a work area in a random access memory (RAM) 42 in accordance with data held in a read-only memory (ROM) 41, and executes car navigation software under control of a central processing unit (CPU) 43. A display screen is generated by the LCD panel 33 driven through an interface 44. A CD-ROM loaded in a CD-ROM drive 45 is accessed and map information is illustratively loaded therefrom. The IC card 3 is accessed through an interface 46, and operations of the controls 34 are detected through an interface 47. Furthermore, current location information is acquired by a GPS (Global Positioning System) receiver 48, and route information retrieved from the IC card 3 is displayed for guide purposes in reference to the current location information thus acquired.

When the user operates specific controls, the car navigation apparatus 4 gains access to the CD-ROM drive 45 according to the navigation data retrieved from the IC card 3, and loads map information corresponding to the route stored in the IC card 3. A map based on the map information is displayed on the LCD panel 33, and the retrieved route is indicated on this map. In addition, the car navigation apparatus 4 offers guidance along the retrieved route based on the current location information from the GPS receiver 48. In this manner, the car navigation apparatus 4 guides the user along the route established previously after careful consideration.

Furthermore, the car navigation apparatus 4 displays still images retrieved from the IC card 3 in response to the user's operation on the controls 34. Those relations between files which are assigned to management data are adhered to for display. Illustratively, as in the case of FIG. 7, a still image taken at the preceding rest stop and recorded in the IC card 3 is displayed by the car navigation apparatus 4 in accordance with suitable location information. In addition, still images about the tourist spot recorded in the IC card 3 at the advance selection of the route are displayed so that the location information about each still image as well as the relations between the files may be efficiently utilized, whereby the ease of use of the car navigation apparatus 4 is improved.

Figure 10:
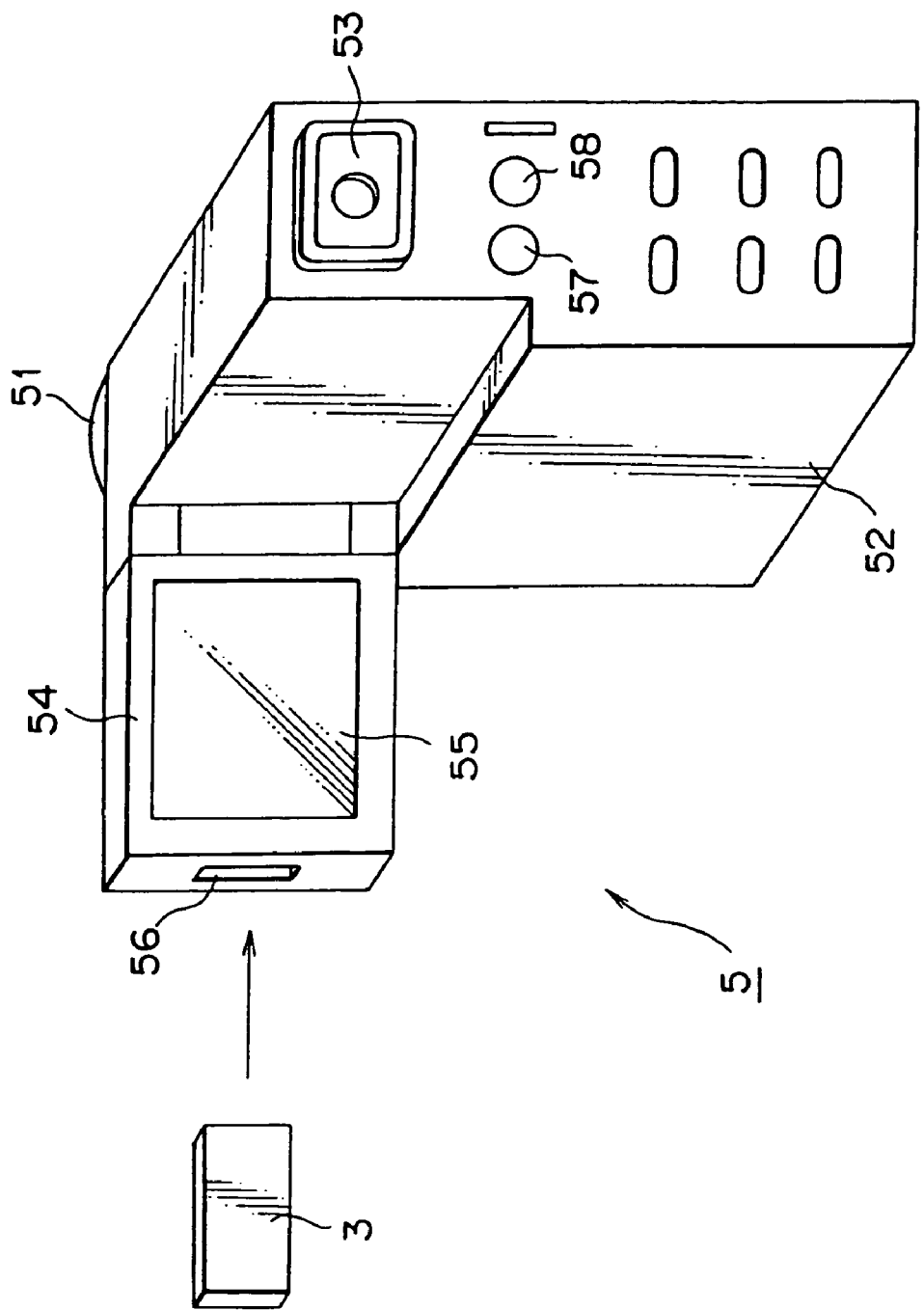
FIG. 10 is a perspective view of a video camera included in FIG. 1.

FIG. 10 is a perspective view of the video camera 5 as it is viewed from the back. The video camera 5 takes pictures of a desired object through a lens 51 mounted at the front of the camera. Motion images are recorded on a video tape and still images are recorded to the IC card 3 by operation of suitable camera controls.

The video camera 5 as a whole has a rectangular shape and comprises a video deck portion 52 constituting a video tape recorder in the lower part of the camera. The lens 51 is mounted at the top front of the video camera 5. An electronic viewfinder 53 is located on the opposite side of the lens 51. A side lid 54 is swung away from the body of the video camera 5. Inside the lid 54 is a liquid crystal display panel 55. An edge of the lid 54 has a slot 56 that accommodates the IC card 3.

Various controls are located on the opposite side of the lid 54 and at the back of the video deck portion 52. Under the electronic viewfinder 53 are controls 57 and 58 for recording motion and still images respectively.

Figure 11:
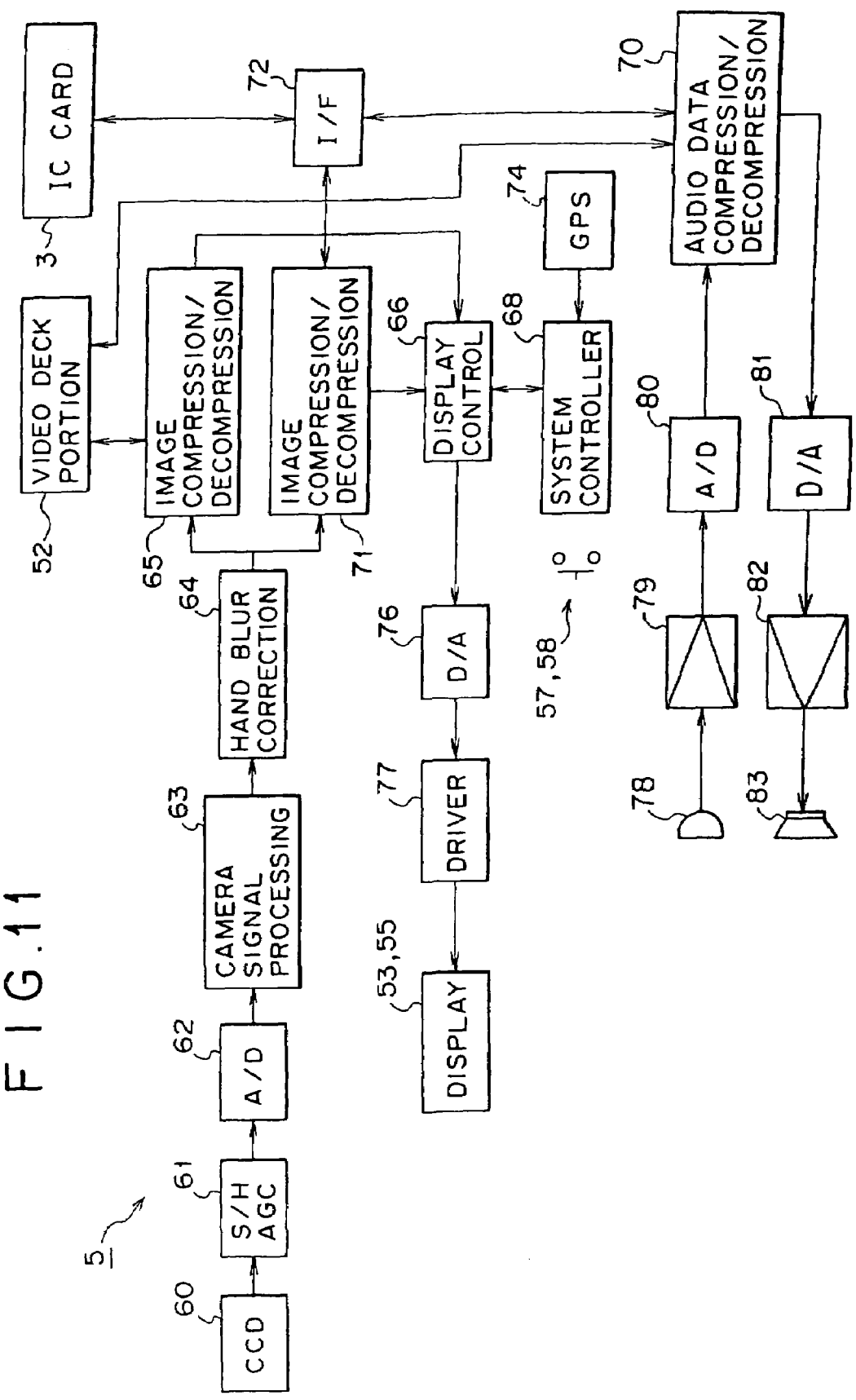
FIG. 11 is a block diagram of a video camera embodying the invention.

FIG. 11 is a block diagram showing a configuration of the video camera 5. In the video camera 5, a CCD solid-state image pickup device 60 forms optical images on its light-receiving plane through a lens arrangement, not shown, and outputs the captured optical images. A sample hold (S/H) AGC circuit 61 subjects the captured images to correlated double sampling followed by signal level correction, thereby generating and outputting red, blue and green color signals.

An analog-digital conversion circuit (A/D) 62 subjects the red, blue and green color signals to analog-to-digital conversion, and outputs digital red, blue and green color signals. A camera signal processing circuit 63 receives the digital color signals and subjects them to such corrective processes as gamma correction and knee correction before computing the corrected signals through matrix operations. In so doing, the camera signal processing circuit 63 generates and outputs digital luminance and color difference signals. A hand blur correction circuit 64 subjects the digital luminance and color difference signals from the camera signal processing circuit 63 to hand blur correction, and outputs the corrected results through electronic zooming.

In an operative state other than reproduction, an image compression/decompression circuit 65 forwards the luminance and color difference signals from the hand blur correction circuit 64 to a display control circuit 66. In a motion image recording mode or in a motion and still image recording mode, the image compression/decompression circuit 65 compresses the luminance and color difference signals from the hand blur correction circuit 64 in response to an operation of the control 57 for motion image recording. The compressed video data are output to the video deck portion 52.

During reproduction of motion images, the image compression/decompression circuit 65 decompresses video data from the video deck portion 52 and outputs the decompressed data to the display control circuit 66. The image compression/decompression circuit 65 compresses luminance and color difference signals illustratively on an MPEG (Moving Picture Experts Group) standard basis, for example.

Under control of a system controller 68, the video deck portion 52 records video data from the image compression/decompression circuit 65 and audio data from an audio data compression/decompression circuit 70 onto a video tape. Conversely, the video deck portion 52 reproduces video and audio data from a video tape and outputs the reproduced data to the image compression/decompression circuit 65 and audio data compression/decompression circuit 70. In this manner, the video camera 5 records and reproduces captured motion images.

In a still image recording mode or in the motion and still image recording mode, an image compression/decompression circuit 71 compresses luminance and color difference signals from the hand blur correction circuit 64 in response to the control 58 operated for still image recording. The compressed video data are output to an interface 72. In a still image reproduction mode, the image compression/decompression circuit 71 decompresses video data coming from the interface 72 and outputs the decompressed data to the display control circuit 66. The image compression/decompression circuit 71 compresses luminance and color difference signals illustratively on a JPEG (Joint Photographic Coding Experts Group) standard basis, for example.

The interface 72 monitors a terminal voltage of the connector accommodating the IC card 3, and detects insertion or removal of the card upon a change in the terminal voltage. When the IC card 3 is found inserted, the card is accessed and a check is made to see if the card is correctly loaded. If the IC card 3 is judged to be properly inserted, a light-emitting diode (not shown) is made to blink. Under control of the system controller 68, the IC card 3 is again accessed: video data from the image compression/decompression circuit 71 and audio data from the audio data compression/decompression circuit 70 are recorded to the card; or video and audio data are retrieved from the card for output to the image compression/decompression circuit 71 and audio data compression/decompression circuit 70.

As described, the video camera 5 is operated to record captured still images along with audio signals to the IC card 3 and to reproduce recorded contents of the card for verification. When contents of the IC card 3 are updated, the corresponding management data are also updated through the interface 72 under control of the system controller 68. At this point, the interface 72 supplements file types making up the management data with recording location information from a GPS receiver 74 as well as information about relations to car navigation data. The video camera 5 thus makes it possible for the above-described car navigation apparatus 4 and personal computer 2 easily to process the recordings in the IC card 3.

The interface 72 causes the LED to blink while the IC card 3 is being accessed. The blinking light warns the user against accidental and destructive removal of the IC card 3 during operation.

The display control circuit 66 exchanges data with the system controller 68. The data exchanges allow operating information about the video camera 5 to be output superimposed on the luminance and color difference signals output by the image compression/decompression circuit 65 or 71.

A digital-analog conversion circuit (D/A) 76 subjects luminance and color difference signals from the display control circuit 66 to digital-to-analog conversion, and outputs analog luminance and color difference signals. Given the analog luminance and color difference signals, a driver 77 drives the electronic viewfinder 53 and the LCD panel 55. The video camera 5 thus allows the user to verify captured images being reproduced and to visually check information about overall system performance.

A microphone 78 picks up sound from an object and outputs an audio signal representing the collected sound. An amplifier 79 amplifies the audio signal from the microphone 78 with a predetermined gain and outputs the amplified signal. An analog-digital conversion circuit (A/D) 80 subjects the audio signal from the amplifier 79 to analog-to-digital conversion and outputs a digital audio signal. The audio data compression/decompression circuit 70 compresses the received digital audio data and sends the compressed audio data to the video deck portion 52 and interface 72 for recording. For reproduction, audio data from the video deck portion 52 and interface 72 are decompressed by the audio data compression/decompression circuit 70 conversely for output. For data compression, the audio data compression/decompression circuit 70 subjects the audio signal to bandwidth division on an ATRAC (Adaptive Transform Acoustic Coding) standard basis followed by spectrum transformation.

A digital-analog conversion circuit (D/A) 81 subjects audio data from the audio data compression/decompression circuit 70 to digital-to-analog conversion. The resulting analog data are sent to an amplifier 82 for audio signal amplification. The amplified audio signal from the amplifier 82 is fed to a speaker 83 for acoustic output. In this manner, the video camera 5 records picked-up sound along with captured images and permits the recorded sound to be played back for on-the-spot verification.

The GPS receiver 74 detects and outputs information about the location of the video camera 5. The system controller 68 comprises a microcomputer that controls performance of the entire video camera 5 in response to operations of the controls (57, 58, etc.) at the back of the video camera 5. The system controller 68 also outputs operating information as needed to the display control circuit 66.

In a normal operation mode established by the user, inserting the IC card 3 prompts the system controller 68 to switch the overall operation from motion image recording to still image recording. In the still image recording mode, the system controller 68 allows still images to be recorded to the IC card 3 in response to an operation of the control 58, discontinuing the recording of motion images by the video deck portion 52 following the operation of the control 57.

In the motion and still image recording mode set by the user, the system controller 68 allows motion images to be recorded by the video deck portion 52 in response to an operation of the control 57 and still images to be recorded to the IC card 3 following the operation of the control 58. In this manner, the system controller 68 permits simultaneous and parallel recording of motion and still images.

During still image recording, the system controller 68 retains location information acquired by the GPS receiver 74 as information about the location where the recording is carried out. If the management data in the IC card 3 reveal the existence of any still images previously recorded in approximately the same location, relations to such images are registered so that the images are associated with the current still image file. If captured still images are judged to be related to data about the date of the trip conducted by car navigation (i.e., if the route based on the car navigation data is being traveled on that day), the still images are associated upon recording with the file of the car navigation data in question.

In the manner described, the video camera 5 allows the above-described car navigation apparatus 4 and personal computer 2 easily to process still images.

In the above embodiment, the car navigation system 1 (FIG. 1) utilizes the personal computer 2 illustratively to establish an itinerary, a destination, and rest stops of a trip thereby selecting a route connecting the established points. The route and itinerary of the trip are recorded in the IC card 3 as car navigation data.

When the IC card 3 is loaded into the car navigation apparatus 4, the user may be guided along the previously established route. While on the move, the user may take pictures at rest stops with the IC card 3 removed from the car navigation apparatus 4 and loaded into the video camera 5 for image pickup.

When the video camera 5 is placed in the normal operation mode, the loading of the IC card 3 is detected by the interface 72. The detection of the card prompts the system controller 68 to switch the operation of the video camera 5 from motion image recording to still image recording. In the still image recording mode, the user verifies a desired object through the electronic viewfinder 53 and LCD panel 55 before operating the control 58 for image pickup. Activation of the control 58 records still image video data to the IC card 3. That is, simply loading the IC card into the video camera 5 allows still images to be recorded instead of motion images. This provides a significant improvement in the ease of operation of the video camera 5.

When the motion and still image recording mode is established, instantaneous scenes may be recorded to the IC card 3 even as motion images are being recorded on a video tape.

Upon recording of still images to the IC card 3, the GPS receiver 74 in the video camera 5 detects information about the current location and records the location information as recording location data within the management data regarding each still picture file. The procedure permits easy recording of the information about locations where the recordings were made.

A recording date of given data is used as a basis for judging whether the data in question are related to the car navigation data stored in the IC card 3. If the data are judged to be related data, relations are recorded between the data and the file of the car navigation data. If a plurality of still images are found to be recorded in about the same location on the basis of the location information acquired by the GPS receiver 74, relations are also recorded between files accommodating these still images.

The IC card 3 with still images thus recorded therein is loaded back into the car navigation apparatus 4. In turn, the car navigation apparatus 4 causes the recorded still images to appear on the LCD panel 33 when the control 34 is operated. Each still image displayed indicates the corresponding recording location information as part of the management data, as well as relevant car navigation data and the number of other related still images taken in each of different recording locations shown on a map. Further operation of, say, the control 34 that invoked the current display may illustratively bring one still image after another onto the screen in a slide show fashion.

The embodiment above thus allows the user to enjoy still images by making effective use of the location information recorded together with the images. Links to car navigation data are used to further facilitate still image display. This means that the associated use of the car navigation apparatus or like equipment allows location information to be used effectively in relation to each still image.

When the IC card 3 with still images recorded therein is loaded into the personal computer 2 at a later date, image processing software of the computer permits verification of the recorded still images in a similar manner. In such a case, each still image displayed indicates the number of other related still images taken in each of different recording locations shown on a map. Operating the keyboard that invoked the current display may illustratively bring one still image after another onto the screen in a slide show fashion.

On the personal computer 2, folding the opened tablet 13 onto the keyboard causes the interface 27 to detect the folding action enabling the tablet 13 to be operated. When a still image count M is drawn with the pen 15 on the tablet 13, a multiple-screen display shows still images associated with each recording location. Thus simple operations allow the user to enjoy and sort out still images more easily than before by effectively utilizing recording location information recorded in conjunction with the images.

The personal computer 2 is reduced in scale while the tablet 13 retains its relatively large size thanks to its folding structure. An enlarged tablet offers enhanced ease of operation to users.

The above-described structure of the embodiment allows the video camera 5 to record the location information acquired by the GPS receiver as the information about recording locations in conjunction with captured still images. The video camera 5 thus permits easy recoding of information about the locations where the recordings were carried out.

When still images and location information are recorded in the IC card serving as a storage medium, effective use is made of the information about the locations where such images were recorded illustratively in conjunction with the car navigation apparatus. The location information stored in the IC card proves more convenient than ever when utilized suitably by the user.

Specifically, still images are recorded to the IC card in relation to information about a route to a destination, i.e., to car navigation data. The related recording of still images allows not only recording locations to be indicated along the route on a map display but also the number of captured still images and contents of the recordings to be indicated in association with each recording location. Similar displays may also be made available on the car navigation apparatus.

The above embodiment was shown using the IC card as a storage medium. However, this is not limitative of the invention. Alternatively, the invention may be applied extensively to diverse storage media including floppy disks.

The embodiment above was described as capable of acquiring information about recording locations through a built-in GPS receiver of the video camera. Alternatively, the location information may be obtained through a GPS receiver of the car navigation apparatus or by other means.

The preceding embodiment was shown having still images displayed by use of the personal computer or car navigation apparatus. Alternatively, the invention may be adapted to other displaying equipment such as TV sets.

The above embodiment was shown applied to the car navigation apparatus described as a typical navigation device. Alternatively, the invention may be applied extensively to other navigation apparatuses such as navigation systems for use on board ships and vessels.

As described and according to the invention, captured images and location information are recorded in relation to one another, and the location information is utilized in displaying the captured still images. This makes it easy to record the information about the locations where the recordings were made, whereby the location information is readily utilized for car navigation purposes in particular.

As many apparently different embodiments of this invention may be made without departing from the spirit and scope thereof, it is to be understood that the invention is not limited to the specific embodiments thereof except as defined in the appended claims.

What is claimed is:

1. An image pickup apparatus comprising:
   location information acquiring means for acquiring current location information about a route to a destination;
   image pickup means for capturing an image of a desired object and outputting the captured image;
   associating means for automatically relating said captured images to said current location information and outputting information about route relations as management data to a display; and
   recording means for recording said captured image, said current location information, and said management data to a removable solid-state storage medium,
   wherein said route relations indicate a number of captured images at a point along a route as the management data for the route and the management data comprises a map of the route.

* * * * *